United States Patent

Martin

[15] 3,671,808

[45] June 20, 1972

[54] ATTACHMENT FOR MAGNETIC STARTERS TO PROTECT THREE-PHASE ELECTRIC MOTORS

[72] Inventor: Frank C. Martin, 2325 North 70th Avenue, Omaha, Nebr. 68104

[22] Filed: Sept. 18, 1970

[21] Appl. No.: 73,532

[52] U.S. Cl. .............................. 317/13 R, 317/23, 317/27 R, 317/46
[51] Int. Cl. ........................................................ H02h 7/085
[58] Field of Search ......................... 317/13 R, 27 R, 23, 46

[56] References Cited

UNITED STATES PATENTS

| | | | |
|---|---|---|---|
| 3,155,880 | 11/1964 | Salina | 317/46 |
| 3,157,826 | 11/1964 | Norton | 317/46 |
| 2,965,809 | 12/1960 | Edsall | 317/46 |
| 3,510,811 | 5/1970 | Pokorny et al. | 317/46 X |

Primary Examiner—James D. Trammell
Attorney—H. Robert Henderson, Louis J. Strom, Glenn H. Antrim and Richard W. Collins

[57] ABSTRACT

This invention provides a small, simple and extremely inexpensive electric motor protector that can be quickly attached and become a part of the circuitry of a conventional magnetic starter, and can thus exert an on/off control over the magnetic starter and the 3-phase electric motor to which said magnetic starter is connected under certain conditions. By the arrangement and connection of two or more magnetic relays which are the components of this electric motor protector, it allows the electric motor to run as long as all three power phases are actively available to the magnetic starter. In the event that any one of the three power phases is lost, due to a blown fuse or other problem, all three phases are shut off, as is the electric motor. As a result, this motor protector positively eliminates dangerous and destructive single-phasing of the motor (operation on the two remaining phases).

2 Claims, 1 Drawing Figure

PATENTED JUN 20 1972 3,671,808
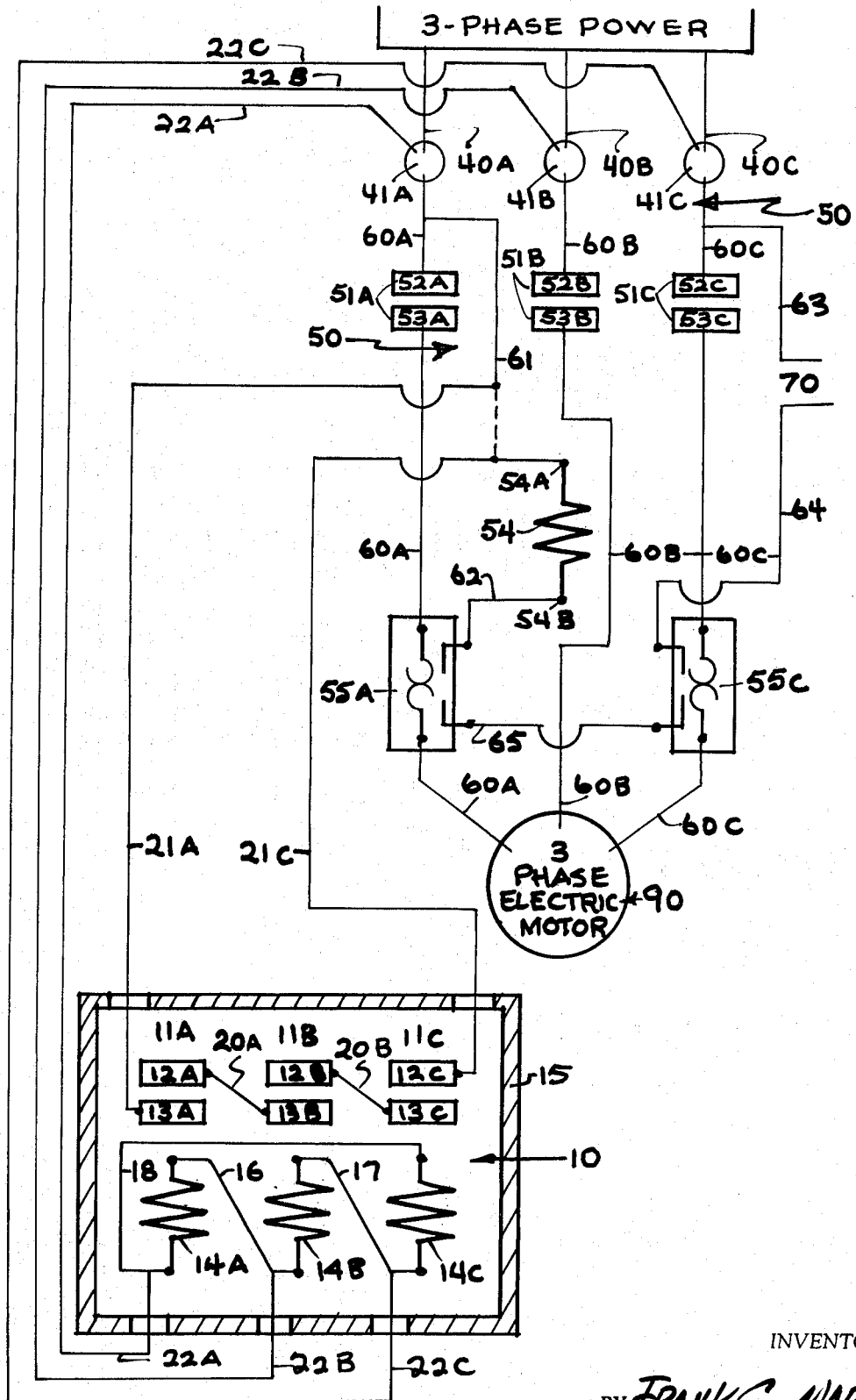
INVENTOR.
BY FRANK C. MARTIN

3,671,808

ATTACHMENT FOR MAGNETIC STARTERS TO PROTECT THREE-PHASE ELECTRIC MOTORS

All over this and foreign countries, particularly in commercial applications, millions of 3-phase electric motors are used to power air conditioners, refrigeration systems and endless tool applications. Due to the use of 3-phase power, they have one very costly weakness. If one of the three power phases is lost, these motors continue to operate on the remaining two phases by feeding back power from the remaining phases thru the circuit of the lost phase. Such single-phasing is recognized as a seriously destructive problem, and a number of relatively complex and costly answers have been offered. Today, heaters are commonly employed in most magnetic starters in an effort to protect motors by shutting them off when they heat up beyond an acceptable temperature. But their lack of dependability has proven a problem. An amazing number of electric motors, so protected, are destroyed each time a single fuse is blown due to overload, electric storm or what have you. Since changes in outside temperature dramatically effect the performance of heaters, an almost seasonal change in heaters (to match the temperatures anticipated) would be required to increase their effectiveness. Such an approach would be impractical.

A relatively new magnetic starter uses a four-coil circuit to effect shut-off of all power when a single phase is lost. Three small coils, each connected to one power phase, feed their power output into a larger-capacity center coil in an additive fashion. As long as the large coil receives its full, pre-designated load, the 3-phase system operates. If one power-phase is lost, thus depriving the large coil of the output of one of the three small coils, all three phases of power are shut off. This system works, but offers problems. First, it has not been adapted for use as an attachment on the millions of motors/magnetic starters that could use such protection. Second, it is extremely expensive . . . having doubled the price of the magnetic starter of which it is a part (and the conventional starters are expensive enough).

A previous patent by this applicant teaches the use of a bridging circuit that requires an alternate source of power(battery). Though absolutely effective, it is more costly and complex than necessary. And there is the need to periodically check the alternate source of power. As one who is daily envolved in this area of art, I know that there is not currently available a motor protector attachment that is acceptable in effectiveness, simple, inexpensive and readily usable with existing conventional magnetic starters. It might be added, with absolutely honesty, that all other devices proposed have two other shortcomings. First, they lack acceptable universality. Different units are required for each level of horsepower and each different operating voltage. This means literally dozens of models, with two variables to be met. Second, all the protectors mentioned and known require re-setting after each shut-off action. In most cases, this requires a trained technician.

It is accordingly an object of this invention to produce a simple 3-phase motor protector that prevents continued operation of such motor on less than all three phases of power, and that allows immediate re-starting of said motor when all three power phases are operable, and without resetting.

It is another object of this invention to provide an electric motor protector that is small of size, simple to install and very inexpensive.

It is another object of this invention to produce a protector for 3-phase electric motors that can be very easily installed on most all current magnetic starters, and that makes use of the same source of current that operates the starter and electric motor.

It is yet another purpose of this invention to provide an electric motor protector that is not effected by changes in temperature or humidity, and that will take action at the precise moment that any one of the three power phases is lost.

It is still another purpose of this invention to provide a motor protector that will, with one model, fit all motors of a set operating voltage, and regardless of horsepower, thus requiring only a few models to match the various voltages currently in common use.

With the above and other objects in view, which will appear as the descriptions proceeds, this invention resides in the novel use and arrangement of parts, and an equally novel relationship to known and used magnetic starter circuitry substantially as hereinafter described and more particularly defined by the appended claims, it being understood that such changes in the precise embodiment of the hereindisclosed invention may be made as come within the scope of the claims.

In the drawings, in which the preferred form of the proposed invention is shown in simple diagrammatic form:

The FIGURE is the diagrammatic representation showing the embodiment 10 of the motor protector device properly attached to the magnetic starter and to the 3—phases of the incoming power. Also shown is the 3—phase electric motor.

The 3-phase electric motor protector, e.g. embodiment 10, is readily employed in conjunction with a magnetic starter 50 which is used with an electric motor 90, and which magnetic starter 50 is connected to a 3—phase power source at the three power poles 41A, 41B and 41C, which are the connecting points for the three phases of incoming power phases 40A, 40B and 40C. The magnetic starter 50 has 3 sets of motor-carrying, high-amperage, workable points 51A, 51B and 51C and a magnetic coil 54, which coil 54 when activated by the flow of power draws movable points 52A, 52B and 52C respectively against fixed points 53A, 53B and 53C thus allowing motor carrying power to flow thru lines 60A, 60B and 60C to the 3—phase electric motor 90. The Magnetic starter 50 also comprises two heaters 55A and 55C which are an integral part of two of the three motor-carrying power phases 60A and 60C, and which heaters are also a part of the low-amperage control circuit that includes the coil 54 and the control 70. The three motor-carrying power phases 60A, 60B and 60C proceed from the power poles 41A, 41B and 41C to the upper, movable points 52A, 52B and 52C of the motor-carrying points 51A, 51B and 51C. They lead, then, from the stationary points 53A, 53B and 53C to the 3—phase electric motor 90, the two outer phases 60A and 60C passing thru the heaters 55A and 55C prior to their connection to the electric motor 90. The low-amperage control circuit, as previously described by parts, comprises a lead 61 that connects the upper pole 54A of the magnetic coil 54 to the power phase 60A at a point between the power pole 41A and the movable point 52A. The bottom pole 54B of the magnetic coil 54 is connected by lead 62 to heater 55A, and heater 55A is connected to the other heaters 55B by a lead 65. The lead 64 then connects heater 55C to the control 70, and lead 63 completes this control circuit by connecting the control in turn to the power phase 60C at a point between power pole 41C and movable point 52C.

As can be seen, when the three phases of incoming power 40A, 40B and 40C enter the magnetic starter 50, the coil 54 is activated. As the activated coil 54 closes workable points 51A, 51B and 51C power flows to the 3—phase electric motor 90. When one of the three phases of power is lost, due to a blown fuse or other cause, the electric power continues to flow to said electric motor 90 thru the remaining two power phases, and in flowing, additionally, back thru the circuit of the lost power phase, keeps coil 54 activated, and the workable points 51A, 51B and 51C closed. The electric motor 90 is now in a "single-phase" condition, and is developing dangerous overheating. It is the purpose of the heaters 55A and 55C to detect this heat, and thru their internal components to break the low amperage circuit leading to the coil 54, thus shutting off all three power phases 60A, 60B and 60C. This, of course is achieved by de-activating the coil 54, and thus allowing workable points 51A, 51B and 51C to break open. As has been indicated previously, this most frequently does not occur, due to the effects of outside temperature, etc. on the action of the heaters, and the motor 90 is destroyed. Let it be said, to amplify the above statement, that every major storm (particularly electrical storms) so destroys vast numbers of 3-phase electric motors.

Embodiment 10 of the proposed motor protector attachment comprises three magnetic breaker points 11A, 11B and 11C, housed in an outer container 15 of appropriate design to allow the emergence of five leads 21A, 21C, 22A, 22B and 22C. Each of the three magnetic breaker points 11A, 11B and 11C has a pair of workable points 12A–13A, 12B–13B and 12C–13C and a coil (magnetic) 14A, 14B and 14C. When the coils 14A, 14B and 14C are activated by electric current, they close their respective movable points 12A, 12B and 12C against fixed points 13A, 13B and 13C, thus completing the control circuit. The three pairs of workable points are connected in series to each other, from 12A to 13B, and from 12B to 13C by leads 20A and 20B, and thence in series with the low-amperage circuit of the magnetic starter 50 at a point between the magnetic coil 54 and its connection to power phase 60A, thus breaching said circuit and becoming an in-series part of said low-amperage, control circuit. The three magnetic coils 14A, 14B and 14C of the motor protector embodiment 10, are connected in series to each other by leads 16, !7 and 18, and each magnetic coil 14A, 14B and 14C is also connected to one, each, of the incoming power phases 40A, 40B and 40C at the power poles 41A, 41B and 41C by its respective lead 22A, 22B and 22C. Thus, when all three phases of incoming power are active, magnetic coils 14A, 14B and 14C are activated and do close movable points 12A, 12B and 12C against fixed points 13A, 13B and 13C respectively. Thus, also, the low-amperage, control circuit of the magnetic starter 50, which now includes these in-series connected workable points 12A–13A, 12B–13B and 12C–13C, is itself completed, and the 3-phase electric motor is allowed to run.

Let us assume, now that power is lost to power pole 41A. No longer is 3-phase electric motor 90 allowed to run on single-phase, because of the feed-back of current from phases 60B and 60C thru the circuit of the lost phase 60A. The moment that power is lost at power pole 41A, power is not only lost to magnetic power circuit 60A, but it is lost as well to magnetic coil 14A, which is connected in series to the other two magnetic coils 14B and 14C. Since these three, in series magnetic coils function on a shared-power basis, the feedback current from the remaining two power phases 60B and 60C is insufficient to activate said magnetic coil 14A (and thus magnetic coils 14B and 14C), and the in-series, workable points 12A–13A, 12B–13B and 12C-13C do snap open killing feedback of magnetic starter coil 54, and the entire supply of power is cut off to the 3-phase electric motor 90. If the problem causing the loss of the one power phase 40A is corrected, the motor 90 automatically resumes running, without the need for re-setting a part of the circuit.

From the foregoing, the construction and circuitry and operation of the motor protector attachment will be readily understood, and further explanation is believed to be unnecessary. However, since numerous modifications, changes and arrays will readily occur to those skilled in the art, it is not desired to limit the invention to the exact construction shown and described, and accordingly all suitable modifications and equivalents may be reasonably resorted to, falling within the scope of the appended claims.

I claim:

1. In combination with a magnetic starter of a 3-phase electric motor having a low-amperage control circuit, a motor protector device that shuts off power to the magnetic starter and thus to the motor, when any one of the three power phases supplying the starter and the motor is lost, the motor protector device comprising:

at least two magnetic relays, each said relay having a fixed point, a movable point and a magnetic coil, wherein said movable point in a first position is biased apart from said fixed point, and said coil is operable when current is flowing therethrough to move said movable point against said fixed point; said coils are connected in series and each said coil is connected to one of the power phases and the third power phase connects between said two coils; said fixed point of one of said relays connected to the movable point of the other said relay; and the movable point of said one relay and the fixed point of said other relay connected in series into the low-amperage control circuit; wherein when power is lost to any one of the three phases current will fail to flow through one of said coils thus causing its respective movable points to move to said first position thus opening the low-amperage control circuit and shutting off the motor.

2. In combination with a magnetic starter of a 3-phase electric motor having a low-amperage control circuit, a motor protector device that shuts off power to the magnetic starter and thus to the motor, when any one of the three power phases supplying the starter and the motor is lost, the motor protector device comprising:

at least three magnetic relays, each said relay having a fixed point, a movable point and a magnetic coil, wherein said movable point in a first position is biased apart from said fixed point, and said coil is operable when current is flowing therethrough to move said movable point against said fixed point; said coils are connected in series and each said coil is connected to one of the power phases; said fixed point of one of said relays connected to the movable point of the other said relay; and the movable point of said one relay and the fixed point of said other relay connected in series into the low-amperage control circuit; wherein when power is lost to any one of the three phases current will fail to flow through one of said coils thus causing its respective movable points to move to said first position thus opening the low-amperage control circuit and shutting off the motor.

* * * * *